United States Patent [19]

Inouye

[11] 4,039,196
[45] Aug. 2, 1977

[54] MECHANICAL SEAL
[75] Inventor: Hiroshi Inouye, Ibaraki, Japan
[73] Assignee: Hitachi, Ltd., Japan
[21] Appl. No.: 689,815
[22] Filed: May 25, 1976
[30] Foreign Application Priority Data
  May 28, 1975   Japan .................................. 50-62905
[51] Int. Cl.² ............................................ F16J 15/34
[52] U.S. Cl. .................................................... 277/11
[58] Field of Search ................. 277/9, 11, 81 R, 136, 277/174, 173, 93 R, 176

[56] References Cited
U.S. PATENT DOCUMENTS

| 2,566,603 | 9/1951 | Dykes | 277/173 |
|---|---|---|---|
| 3,391,942 | 7/1968 | Wilson | 277/93 |
| 3,410,566 | 11/1968 | Wiese | 277/81 R |
| 3,612,548 | 10/1971 | Tracy | 277/93 |
| 3,889,958 | 6/1975 | Bennett | 277/174 |

Primary Examiner—Richard E. Aegerter
Attorney, Agent, or Firm—Craig & Antonelli

[57] ABSTRACT

A mechanical seal for use with shafts of rotary machines is of unitary construction for ease in handling. It can be attached to, and detached from, the sealing portion of the shaft accurately and readily. The attachment and detachment of the seal are expedited by the combination of a protuberance or protuberances of a shaft sleeve which is mounted on the shaft and carries a rotating seal element, and circumferential and axial grooves formed on the inner surface of a retainer which holds a stationary seal element.

5 Claims, 6 Drawing Figures

MECHANICAL SEAL

BACKGROUND OF THE INVENTION

1. Field of the Invention

This invention relates to a mechanical seal for use in rotary machines, such as pumps and compressors.

2. Description of the Prior Art

Mechanical seals are built of many components and are in wide use for the sealing of shafts in pumps, compressors and other rotary machines.

Conventional mechanical seals for the shafts of such rotary machines usually comprise a rotating seal element mounted on the rotating shaft for rotation therewith, a retainer fixed in a seal box formed around the shaft, a stationary seal element held by the retainer, and spring means for pressing one of the seal elements against the other to maintain a sliding seal-face contact between the two elements. In attaching the mechanical seal to, or detaching the same from, the rotating shaft, the seal components, especially the stationary seal element and the retainer that holds the element in place, provide difficulties in handling because they must be fitted or removed within the relatively narrow space of the seal box around the shaft. This is particularly true with smaller seal boxes in which those components are more difficult of access to the unaided hand of the operator.

SUMMARY OF THE INVENTION

It is an object of the present invention to provide a mechanical seal adapted to be installed in, and removed from, a seal box positively and within a short period of time.

Another object of the invention is to provide a mechanical seal adapted to be installed in, and removed from, the seal box while keeping the damageable end faces of the seal unexposed and protected at all times.

Yet another object of the invention is to provide a mechanical seal adapted to be easily incorporated in a seal box which contains a special fluid sealed therein and is difficult to reach for the unassisted hand of the operator.

A further object of the invention is to provide a mechanical seal for installations where its attachment or detachment must be expedited for some reason, as a possibility of radioactive contamination.

These objects of the invention are realized by a mechanical seal arrangement in which the shaft sleeve that supports the rotating seal element and is fitted over the rotating shaft includes a circumferentially incontinuous protuberance formed on the outer surface thereof, and the retainer fitted in the seal box around the shaft and which holds the stationary seal element has on its inner surface a plurality of circumferential grooves adapted to engage the protuberance of the shaft sleeve and also a plurality of axial grooves staggered in phase for introducing the protuberance selectively into one of said circumferential grooves, so that the engagement of the grooves and protuberance may be combined with the fitting of the shaft sleeve over the rotating shaft and removal therefrom to facilitate the installation of the mechanical seal in, and the removal of the same from, the seal box.

Other features, objects, and advantages of the invention will become apparent from the following description when taken in conjunction with the accompanying drawings.

DESCRIPTION OF PREFERRED EMBODIMENTS

Figure 1:
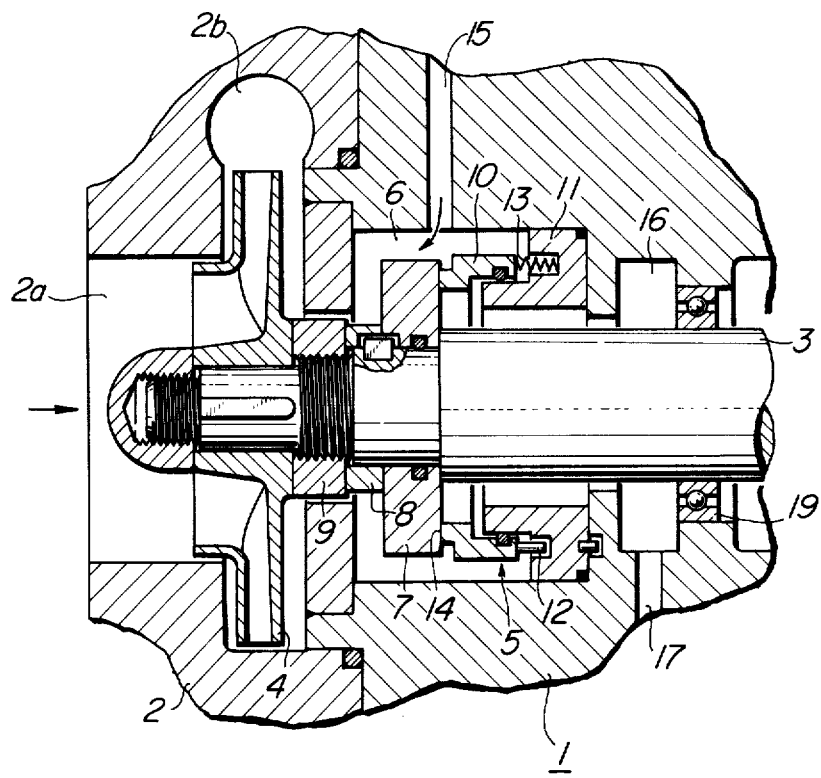
FIG. 1 is a vertical sectional view of a conventional mechanical seal installed in a centrifugal pump which is supported in a cantilever fashion.
Figure 2:
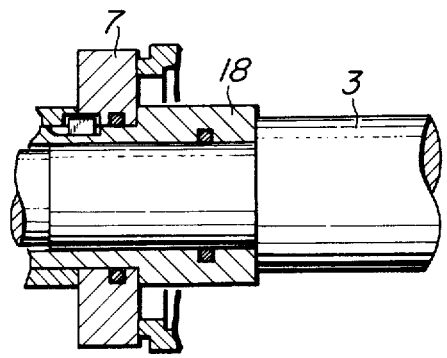
FIG. 2 is a vertical sectional view of a mechanical seal of another prior art design.

Referring to FIG. 1, there is shown and ordinary mechanical seal as installed in a centrifugal pump which is supported in a cantilever fashion comprising a pump body 1, a pump casing 2 secured to the body by bolts or other fasteners, a rotating shaft 3 extending through the centers of the pump body and casing, and an impeller 4 mounted on the free end of the rotating shaft to force the fluid drawn in form the suction 2a centrifugally into the discharge 2b. The mechanical seal, generally indicated by the numeral 5, is housed in a seal box 6 provided within the pump body 1. One of its components, a rotating seal element 7, is fitted on a reduced-diameter portion of the shaft 3 and is made fast thereto by a lock nut 9 via a spacer 8. A stationary seal element 10, which is another basic component of the mechanical seal 5, carries a pin 12 with which it is unrotatably held by a retainer 11 secured to the pump body 1. On the other hand, the stationary seal element 10 is biased by springs 13 against the rotating seal element 7, thus establishing a sliding seal-face contact at 14. The pump body 1 is formed with a flushing fluid passage 15, a leak recovery chamber 16, and a drain passage 17. As indicated in FIG. 2, the rotating seal element 7 is sometimes held by a shaft sleeve 18 on the rotating shaft 3 rather than being directly mounted on the shaft as already described.

The mechanical seal 5 shown in FIG. 1 is installed in, or removed from, the seal box 6 in the following way. Because the pump body 1 is usually kept stationary by a base or the like and also because the rotating shaft 3 is secured to the pump body by a bearing 19, a common practice for the operator is to stand on the left of the pump as viewed in the figure and then put the mechanical seal into or out of place, as the case may be. In either case the seal components that involve greatest difficulties in handling are the stationary seal element 10 and the retainer 11 therefore. Attachment and detachment of these components are very cumbersome because they must be handled within the limited spaced of the seal box 6 formed between the rotating shaft 3 and the pump body 1. For these purposes specially designed jigs are used but the work is nevertheless exacting and requires much time.

Figure 3:
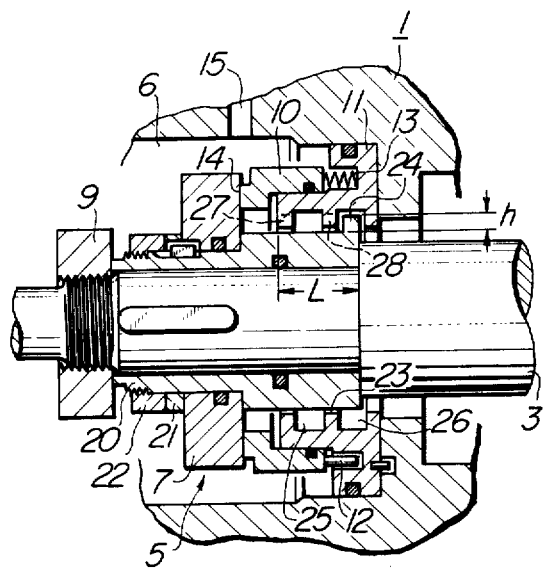
FIG. 3 is a vertical sectional view of a stationary type mechanical seal embodying the present invention.
Figure 4:
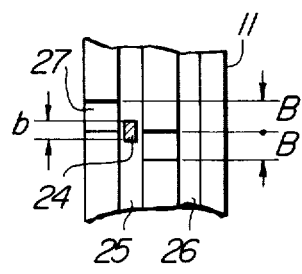
FIGS. 4 and 5 are views of the inner periphery of a retainer, shown in fragmental developments to illustrate the assembly of the seal in accordance with the invention.

A mechanical seal embodying the present invention is shown in FIG. 3, where like parts have been given like numbers with respect to FIG. 1. here a shaft sleeve 20 is fitted over the rotating shaft 3, and the rotating seal element 7 is fixed to the sleeve 20 by a sleeve spacer 21 and a sleeve lock nut 22. The shaft sleeve 20 and the retainer 11 that holds the stationary seal element 10 in place are built to provide an axial overlap L when they and other associated parts have been assembled together. The clearance 23 between the outer surface of the shaft sleeve 20 and the inner surface of the retainer 11 is set to a minimum value, just enough to keep them out of contact with each other during operation. On the outer surface of the shaft sleeve 20 within the range L, there is formed a circumferentially incontinuous protuberance 24 with a height $h$ greater than the clearance 23. Also, on the inner surface of the retainer 11 within the range L, there are formed a first circumferential groove 25, a second circumferential groove 26, a first axial groove 27, and a second axial groove 28, each of which is adapted to engage the protuberance 24. The positional relationship of these grooves 25 to 28 on the inner surface of the retainer 11 is desirably such that, as such in FIG. 4, the first axial groove 27 that communicates the space adjacent the end face of the retainer with the first circumferential groove 25 is not aligned with the second axial groove 28 that established communication between the first and second circumferential grooves 25, 26, but the two axial grooves 27, 28 are staggered in phase by not less than about the width B of each groove. The width $b$ of the protuberance 24 on the shaft sleeve 20 is chosen to be less than the width B of the grooves 27, 28 of the retainer 11 to permit the passage of the protuberance through either groove.

The mechanical seal in accordance with the present invention is assembled and mounted in place in the manner now to be described.

First, the stationary seal element 10 is associated with the retainer 11, with the anti-rotation pin 12 and the springs 13 disposed therebetween. At this time the springs 13 are fully stretched but the stationary seal element 10 is not disengageable from the retainer 11, and the tip of the pin 12 is slightly within the opposing hole of the retainer. The rotating seal element 7 is placed on the shaft sleeve 20 and is fastened thereto by the sleeve spacer 21 and sleeve lock nut 22. Next, the protuberance 24 of the shaft sleeve 20 carrying the rotating seal element 7 thereon is led through the first axial groove 27 of the retainer 11 and then is slightly rotated inside the first circumferential groove 25 as in FIG. 4, whereby the retainer is associated with the shaft sleeve 20 with a play corresponding to the clearance 23. The rotating and stationary seal elements 7, 10 are kept in contact under the urging of the springs 13 to provide sliding seal faces 14 therebetween. This seal-face contact determines the axial relative positions of the protuberance 24 on the shaft sleeve 20 an the first circumferential groove 25 of the retainer 11, and the both rotating and stationary seal elements 7, 10 and the retainer 11 are assembled on the shaft sleeve 20. The shaft sleeve 20 with the sub-assembly thereon is forced onto the rotating shaft 3 from the left side as viewed in FIG. 3 until the protuberance 24 on the shaft sleeve comes into contact with the inner side wall of the circumferential groove 25 of the retainer. In this manner the retainer 11 can be pushed into position within the seal box 6 of the pump body 1. After the retainer 11 has been fitted in place, the rotating shaft 3 is rotated to the point where the protuberance 24 of the shaft sleeve 20 thereon can pass through the second axial groove 28 of the retainer. The shaft sleeve 20 is then forced inwardly over the shaft 3 until its right end abuts against the shoulder of the shaft, where the sleeve is fastened in place by the lock nut 9. In the manner described the mechanical seal 5 is installed in the seal box 6 of the pump body 1. The dimensions of the circumferential groove 26 of the retainer are such that, when the mechanical seal has been installed as described, the protuberance 24 on the sleeve can freely move within the groove without contacting the surrounding wall.

Figure 5:
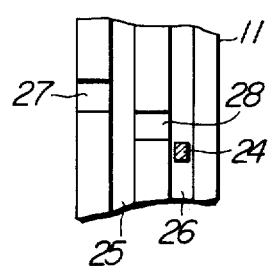

When the mechanical seal is to be detached from the seal box 6 of the pump body 1, the lock nut 9 is removed and the shaft sleeve 20 is pulled outwardly of the rotating shaft 3. Then, as shown in FIG. 5, the protuberance 24 on the shaft sleeve 20 will get in contact with the outer side wall of the second circumferential groove 26 of the retainer 11, so that the rotating and stationary seal elements 7, 10 and retainer 11 can be altogether pulled off from the seal box 6.

Although the shaft sleeve 20 of the embodiment thus far described is formed with only one protuberance 24 thereon, it may have two or more such projections instead. In the latter case it is necessary to provide the axial grooves on the inner surface of the retainer 11 in a number and with differences in phase corresponding to the plurality of protuberances 24. also, while the mechanical seal above described is of the stationary type, the invention is applicable to the rotary type as well.

Figure 6:
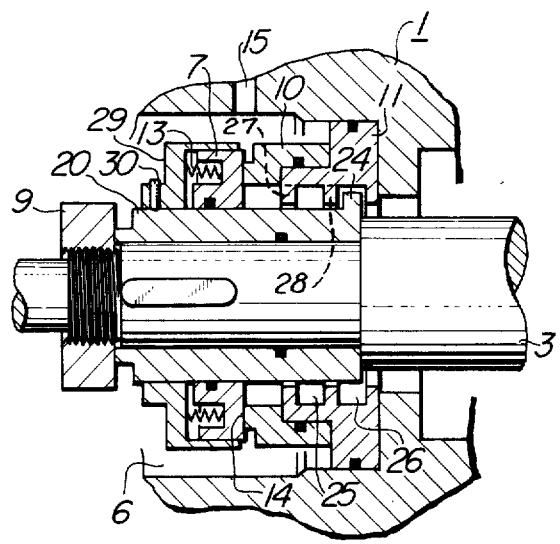
FIG. 6 is a vertical sectional view of a rotary type mechanical seal embodying the invention.

FIG. 6 illustrates such a rotary type mechanical seal embodying the invention. A cup-shaped member 29 is secured to the shaft sleeve 20 by a set screw 30, and the rotating seal element 7 is embraced by the cup-shaped member, with springs 13 disposed therebetween. The rotating seal element 7 is kept at the opposite end in contact with the stationary seal element 10 under the urging of the springs 13 to provide sliding seal faces 14. Under actual operating conditions, the sliding seal faces 14 will be subjected to a sealing fluid pressure in addition to the force of the springs 13. The embodiment shown in FIG. 3 is classifiable as a stationary type mechanical seal in that the seal element 10 under the urging of the springs 13 is kept stationary, whereas the embodiment in FIG. 6, by contrast, is a rotary type because the seal element 7 biased by the springs 13 is rotatable with the shaft. The procedure for the attachment and detachment of the mechanical seal shown in FIG. 6 is the same as that for the embodiment in FIG. 3 and therefore the explanation is not repeated here.

As has been described in detail, the mechanical seal in accordance with the invention is installed in, or removed from, the seal box of a pump body by assembling rotating and stationary seal members on a shaft sleeve to provide a unitary construction and then forcing the assembled sleeve onto or off from the shaft. Thus, the mechanical seal of the invention not only is more accurately and positively attached and detached than conventional seals of the character but also reduces the time required therefor to one-third or less. in addition, because the rotating and stationary seal elements are assembled to a unitary form and are attached or detached together, the seal faces in sliding contact which would otherwise be liable to damage during handling will be kept unexposed and protected at all time. These are among the great practical advantages of the invention.

What is claimed is:

1. In a mechanical seal including a shaft sleeve fitted over a rotating shaft for rotation therewith, a rotating seal element secured to said shaft sleeve, a retainer fitted in a seal box provided around said rotating shaft, a stationary seal element held by said retainer, and spring means for urging one of said seal elements against the other so as to maintain sliding seal-face contact between said seal elements, the improvement comprising at least one protuberance formed on the outer surface of said shaft sleeve, a plurality of axially spaced, circumferential grooves formed on the inner surface of said retainer to receive said protuberance of said shaft sleeve movably therein, and a plurality of axial grooves staggered in phase and also formed on the inner surface of said retainer to assist in introducing said protuberance selectively into one of said circumferential grooves, so that the mechanical seal can be easily installed in, and removed from, said seal box by the engagement of said protuberance of said shaft sleeve with said grooves and also by the fitting of said shaft sleeve over said rotating shaft and removal therefrom.

2. A mechanical seal according to claim 1 wherein said stationary seal element is held by said retainer through said spring means.

3. A mechanical seal according to claim 1 wherein said rotating seal element is secured to said shaft sleeve through said spring means.

4. A mechanical seal according to claim 2 wherein said shaft sleeve includes a plurality of protuberances and said retainer has a plurality of axial grooves formed on its inner surface and adapted to receive said protuberances.

5. A mechanical seal according to claim 3 wherein said shaft sleeve includes a plurality of protuberances and said retainer has a plurality of axial grooves formed on its inner surface and adapted to receive said protuberances.

* * * * *